US008989985B2

(12) United States Patent
Kimiagar et al.

(10) Patent No.: US 8,989,985 B2
(45) Date of Patent: Mar. 24, 2015

(54) VEHICLE-BASED POSITIONING SYSTEM AND METHOD OF USING THE SAME

(71) Applicant: Thales Canada Inc, Toronto, Ontario (CA)

(72) Inventors: Ehsan Kimiagar, Maple (CA); Firth Whitwam, Toronto (CA)

(73) Assignee: Thales Canada Inc., Toronto, Ontario (CA)

( * ) Notice: Subject to any disclaimer, the term of this patent is extended or adjusted under 35 U.S.C. 154(b) by 0 days.

(21) Appl. No.: 13/966,798

(22) Filed: Aug. 14, 2013

(65) Prior Publication Data

US 2015/0051806 A1    Feb. 19, 2015

(51) Int. Cl.
| G05D 1/02 | (2006.01) |
| B60T 7/12 | (2006.01) |
| G01C 21/16 | (2006.01) |
| G01C 21/18 | (2006.01) |

(52) U.S. Cl.
CPC ............... B60T 7/126 (2013.01); G01C 21/16 (2013.01); G01C 21/18 (2013.01)
USPC ............................... 701/93; 701/500; 701/501

(58) Field of Classification Search
USPC ............ 701/93, 408, 409, 500, 501, 502, 520
See application file for complete search history.

(56) References Cited

U.S. PATENT DOCUMENTS

| 5,332,180 A | 7/1994 | Peterson et al. |
| 5,364,047 A | 11/1994 | Petit et al. |
| 5,638,078 A | 6/1997 | Wichtel |
| 5,764,014 A | 6/1998 | Jakeway et al. |
| 5,986,547 A | 11/1999 | Korver et al. |
| 6,237,504 B1 | 5/2001 | Tanahashi et al. |
| 6,377,215 B1 | 4/2002 | Halvorson et al. |
| 6,459,965 B1 | 10/2002 | Polivka et al. |
| 6,609,049 B1 | 8/2003 | Kane et al. |
| 6,681,160 B2 | 1/2004 | Bidaud |
| 6,826,478 B2 | 11/2004 | Riewe et al. |
| 6,845,953 B2 | 1/2005 | Kane et al. |
| 6,970,774 B2 | 11/2005 | Kane et al. |
| 7,756,632 B2 | 7/2010 | Wise et al. |
| 7,835,832 B2 * | 11/2010 | Macdonald et al. ............ 701/24 |
| 8,260,480 B2 | 9/2012 | James |
| 8,296,065 B2 | 10/2012 | Haynie et al. |
| 2004/0140405 A1 | 7/2004 | Meyer |
| 2009/0063084 A1 | 3/2009 | Jensen |
| 2010/0076631 A1 | 3/2010 | Mian |
| 2010/0312461 A1 | 12/2010 | Haynie et al. |
| 2013/0316310 A1 * | 11/2013 | Musicant et al. ............... 434/65 |
| 2014/0145804 A1 * | 5/2014 | Pagani .......................... 335/180 |

* cited by examiner

*Primary Examiner* — Richard Camby
(74) *Attorney, Agent, or Firm* — Lowe Hauptman & Ham, LLP

(57) ABSTRACT

A vehicle-based positioning system (VBPS) for a vehicle traversing a guideway, the VBPS includes an inertial navigation system (INS) on-board the vehicle, wherein the INS is configured to detect inertial parameters of the vehicle while the vehicle traverses the guideway, the detected inertial parameters including roll, pitch and yaw of the vehicle. The VBPS includes a guideway database, wherein the guideway database is configured to store inertial parameters of the guideway at a plurality of locations along the guideway, the stored inertial parameters include roll, pitch and yaw of the guideway. The VBPS further includes a vital on-board controller (VOBC), the VOBC is configured to determine a position of the vehicle based on a comparison of the detected inertial parameters with the stored inertial parameters. The VOBC is configured to limit comparison of the inertial parameters with the stored inertial parameters based on a latest checkpoint passed by the vehicle.

20 Claims, 6 Drawing Sheets

VEHICLE-BASED POSITIONING SYSTEM AND METHOD OF USING THE SAME

BACKGROUND

Determining the position of each vehicle in a guideway network is essential to maintain precise control and coordinated movement of vehicles in the guideway network. In some solutions, vehicle positioning information is generated using on-guideway devices positioned on a guideway, such as axle counters or track circuits, which generate a position signal in response to the presence of the vehicle on the guideway at the location of the on-guideway device. If the on-guideway device is damaged so that false positive or false negative position signals are generated, personnel are dispatched to the location of the on-guideway device to perform repairs.

In some other solutions, vehicle positioning information is generated using wayside devices positioned along a wayside of the guideway, such as transponders or optical equipment, which generate the position signal in response to passage of the vehicle by the wayside device. If the wayside device is damaged so that false positive or false negative position signals are generated, personnel are dispatched to the location of the wayside device to perform repairs. In each of the above described solutions, the position information is transmitted to a separation control system, which provides movement authorization to the vehicles in the guideway network to maintain appropriate spacing between the vehicles and to control transfer of passengers or items from one location to another. The position information is also transmitted to the vehicle movement control system to enable the vehicle to be controlled to a stop.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are examples and are not intended to be limiting.

Position determination of a vehicle within a guideway network enables efficient and coordinated movement of vehicles throughout the guideway network. Position determining equipment that is not located on-board the vehicle, such as on the guideway or along a wayside of the guideway, is subject to a higher risk of damage and interference from the environment and other external conditions. For example, dust and debris positioned between an optical transmitter and an optical receiver renders false positive or false negative results, in some instances. Also, oxidation and other deterioration of exposed contacts is a more prevalent concern for position determining equipment exposed to the environment. The time and cost spent repairing or cleaning the positioning equipment is significantly reduced by housing the position determining equipment entirely on-board the vehicle. By, reducing or eliminating a connection to the axle/wheel of a vehicle, reliability for operation of the vehicle is increased.

In some solutions which do not include the vehicle-based positioning system, the 'course positioning' provided by the guideway mounted equipment is enhanced by tachometers or wheel mounted sensors for finer resolution to provide the accurate positioning.

Figure 1:
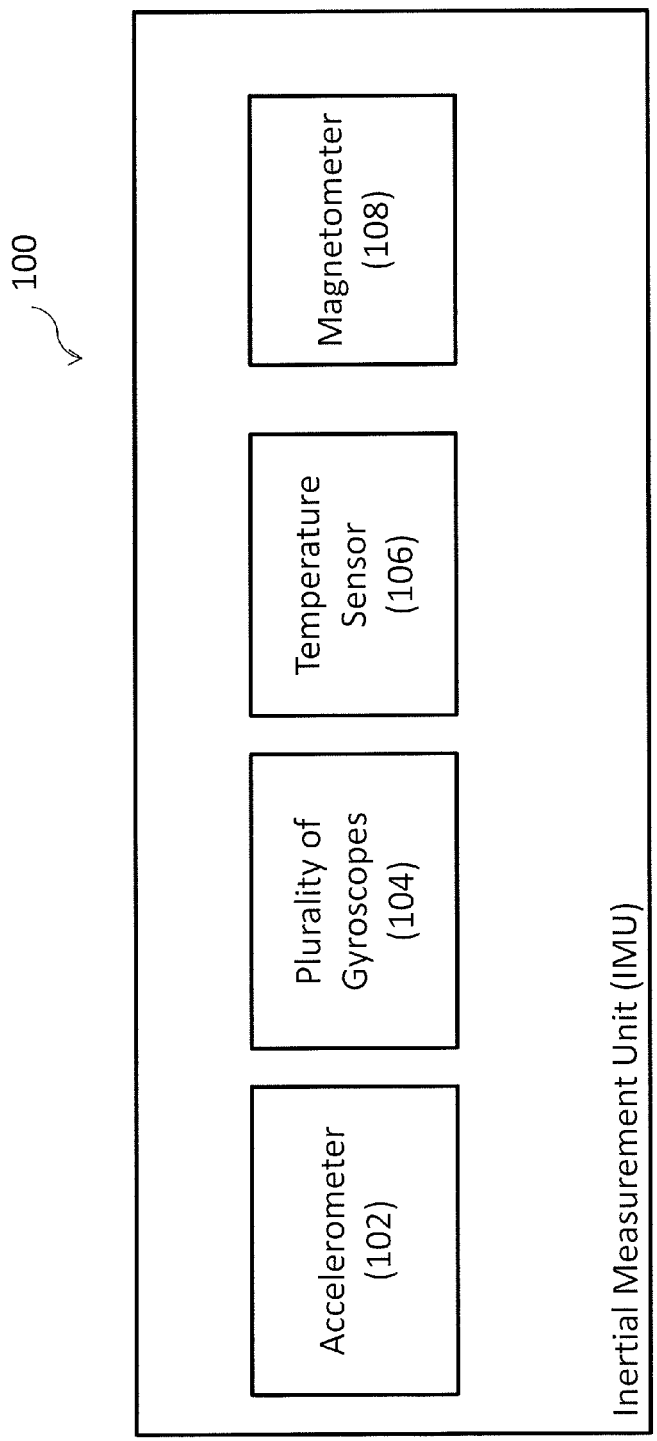
FIG. 1 is a block diagram of an inertial navigation system (INS) in accordance with one or more embodiments.

A vehicle-based positioning system (VBPS) includes an inertial navigation system (INS) 100 located on-board the vehicle. FIG. 1 is a block diagram of INS 100 in accordance with one or more embodiments. INS 100 includes a processor 102 configured to receive information from a plurality of sensors and receive information from an external control system (not shown) through a transceiver 104. The plurality of sensors includes an accelerometer 106 configured to measure acceleration, heading, tilt and vibration of the vehicle. The plurality of sensors further includes an inertial measurement unit (IMU) 108 configured to measure a change in inertia, e.g., pitch, roll and yaw, of the vehicle. In some embodiments, the plurality of sensors includes additional sensors such as a Global Positioning System (GPS) 110, a magnetometer 112, a tachometer 114, an altimeter 116 or a temperature sensor 118.

Processor 102 is configured to receive the information from the plurality of sensors and, based on the received information, generate an orientation signal indicating a precise orientation state of the vehicle including heading, pitch, roll and yaw of the vehicle. In some embodiments, the orientation signal generated by processor 102 includes additional information such as speed, altitude, distance traveled from a latest checkpoint, or magnetic coordinates of the vehicle. Processor 102 sends the orientation signal to transceiver 104. Processor 104 is also configured to receive information from transceiver 104 including an activation signal, in some embodiments where INS 100 is a secondary position determining system. Processor 102 is also configured to receive information regarding threshold limits for measurements by the plurality of sensors. In some embodiments, the threshold limits are used to determine an error tolerance in a respective sensor. In some embodiments, the threshold limits are used to determine an impact to the vehicle or a departure of the vehicle from the guideway, e.g., a derailment.

Transceiver 104 is configured to receive the orientation signal from processor 102 and transmit the orientation signal to external components or networks. Transceiver 104 is also configured to receive information from the external components or networks and transmit the received information to processor 104.

Accelerometer 106 is configured to measure acceleration of the vehicle along the guideway. In some embodiments, processor 102 uses the measured acceleration to determine a speed or a heading of the vehicle. Accelerometer 106 is also configured to measure tilt and vibration of the vehicle. In some embodiments, processor 102 uses the measured tilt to determine whether the vehicle has been impacted by another object, e.g., sideswiped by another vehicle. For example, a rate of change in a detected tilt above a threshold indicating an impact to the vehicle. In some embodiments, processor 102 uses the measured tilt to determine whether the vehicle has departed the guideway. For example, if the measured tilt exceeds a threshold value, the orientation signal indicates the vehicle is no longer traveling along the guideway. In some embodiments, processor 102 uses the measured vibration to determine a condition of the guideway. For example, if the measured vibration exceeds a threshold limit, processor 102 determines the guideway is in need of repair. In some embodiments, processor 102 generates a repair signal indicating a need for repair to the guideway. In some embodiments, the accelerometer comprises at least one of a piezoelectric accelerometer, a laser accelerometer, or a pendulous integrating gyroscopic accelerometer (PIGA).

IMU 108 is configured to measure a roll, pitch and yaw of the vehicle. In some embodiments, IMU 108 comprises a plurality of gyroscopes and/or accelerometers. In some embodiments, IMU 108 and accelerometer 106 are combined into a single sensor arrangement. In some embodiments, IMU 108 determines the roll, pitch and yaw of the vehicle with respect to a direction of gravity. In some embodiments, IMU 108 also determines a bearing, a heading and an altitude of the vehicle. In some embodiments, IMU 108 further includes a gravitational sensor to reduce errors in the measured roll, pitch and yaw. In some embodiments, a temperature sensing element is included in IMU 108. The temperature sensing element provides calibration for IMU 108 by accounting for temperature induced variations in the determined values.

GPS 110 is configured to measure a longitude and latitude of the vehicle. In some embodiments, GPS 110 is used to provide a coarse estimate of a location of the vehicle. In some embodiments, GPS 110 is used to reduce errors in the measurements of IMU 108 by providing INS 100 with a reference point, so that minor errors in position determination do not accumulate in the INS.

In some embodiments, magnetometer 112 is configured to measure a direction of gravity to help calibrate the measurements of IMU 108. In some embodiments, magnetometer 112 is used to determine a coarse estimate of longitude and latitude of the vehicle based on a magnetic field of the Earth. In some embodiments, magnetometer 112 comprises a vector magnetometer such as a rotating coil magnetometer, a Hall effect magnetometer, a magnetoresistive device or another suitable magnetometer.

Tachometer 114 is configured to measure a number of revolutions of a wheel of the vehicle. The number of revolutions of the wheel is used to estimate a distance traveled from a latest checkpoint, in some embodiments. In some embodiments, a rate of wheel rotation is used to determine a speed of the vehicle. In some embodiments, tachometer 114 comprises an opto-isolator slotted disk sensor, a Hall effect sensor, or another suitable tachometer.

Altimeter 116 is configured to measure an altitude of the vehicle relative to a specific point, e.g., sea level. In some embodiments, altimeter 116 is used to calibrate the measurement of IMU 108. In some embodiments, altimeter 116 comprises a barometric altimeter, a global positioning system, or another suitable altimeter.

Temperature sensor 118 is configured to measure a temperature of an outside environment surrounding the guideway. In some instances, a temperature of the guideway impacts the integrity of the guideway. For example, as the temperature of the guideway increases, the guideway is more susceptible to deformation resulting from the passage of the vehicle. In some embodiments, the temperature is used to determine a maximum allowed speed of the vehicle. In some embodiments, temperature sensor 118 comprises a thermostat, a thermistor, a thermocouple, or another suitable temperature sensing element.

INS 100 is configured to detect inertial parameters of the vehicle at any point along the guideway. Using the information from INS 100, the VBPS is able to determine a position of the vehicle along the guideway by comparing the detected inertial parameters of the vehicle obtained from the INS with data stored in a guideway database. In some embodiments, the guideway database includes a three-dimensional map of the guideway including stored inertial parameters of the guideway. A comparison between the detected inertial parameters of the vehicle and the stored inertial parameters of the guideway provides a position of the vehicle along the guideway.

In some embodiments, the guideway database is generated by traversing a survey vehicle including an INS, e.g., INS 100, along the guideway. An additional position determining system is used to correlate the detected inertial parameters detected by the INS of the survey vehicle with a position along the guideway. This information is cross-referenced and stored in the guideway database. In some embodiments, the survey vehicle traverses along the guideway more than once in order to increase the precision of the stored inertial parameters in the guideway database.

Figure 2:
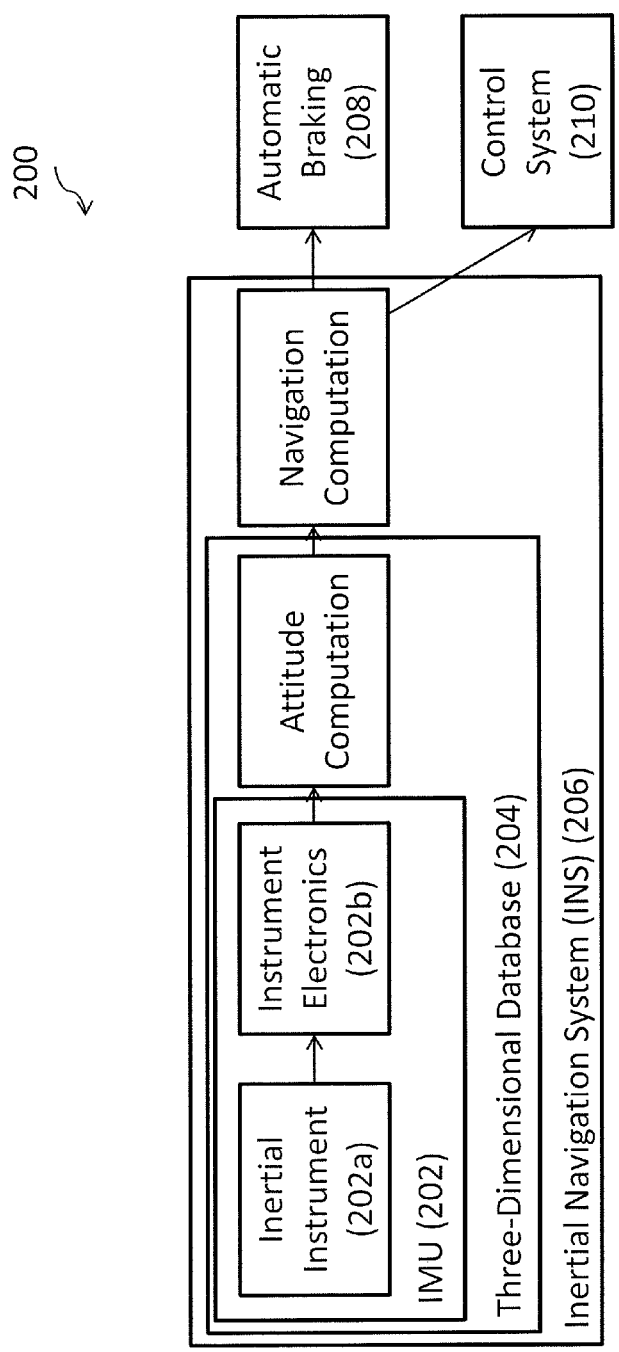
FIG. 2 is a block diagram of a vehicle-based positioning system (VBPS) including an INS in accordance with one or more embodiments.

FIG. 2 is a block diagram of a VBPS 200 including an INS 202 in accordance with one or more embodiments. In some embodiments, INS 202 is the same as INS 100 (FIG. 1). VBPS 200 further includes a guideway database 204. Guideway database 204 includes stored inertial parameters cross-referenced with positions along the guideway. VBPS 200 further includes a vital on-board controller (VOBC) 206. VOBC 206 is configured to compare the detected inertial parameters from INS 202 with the stored inertial parameters of the guideway from guideway database 204. VOBC 206 is also configured to generate signals for controlling an automatic speed and braking control system 208. VOBC 206 is also configured to transmit determined position information to a centralized or de-centralized control system 210 external to the vehicle.

In some embodiments, VOBC 206 is implemented by running a background process on every vital machine having safety integrity level 4 (SIL 4) in the system which listens to communication traffic and collects key data as identified by a configuration profile of the VOBC. In some embodiments, SIL 4 is based on International Electrotechnical Commission's (IEC) standard IEC 61508, in at least one embodiment. SIL level 4 means the probability of failure per hour ranges from $10^{-8}$ to $10^{-9}$.

In some embodiments, VOBC 206 uses the detected inertial parameters and the determined position to refine the stored inertial parameters of guideway database 204. For example, over time guideway alignment changes, in some instances, due to wear on the guideway. While the detected inertial parameters are within an error tolerance of the stored inertial parameters for a current passage of the vehicle, subsequent passages of the vehicle (or different vehicles) will be outside the error tolerance, in some instances. If the detected inertial parameters do not match any of the stored inertial parameters within the error tolerance, the VOBC 206 will not be able to determine a position of the vehicle, in some instances. In some embodiments, if the VOBC 206 is unable to determine the position of the vehicle, the VOBC generates a signal to brake the vehicle to a stop. In embodiments where the VOBC 206 updates guideway database 204 after determining a position of the vehicle, a risk of not being able to determine the position of the vehicle is reduced.

In some embodiments, VOBC 206 limits a number of stored inertial parameters for comparison based on a latest checkpoint. In some embodiments, the latest checkpoint includes a station, a switch, a landmark, an antenna or other distinguishing feature of the guideway. By limiting the number of stored inertial parameters for comparison based on the latest checkpoint, VOBC 206 reduces a computing time for determining the position of the vehicle. VOBC 206 is also able to reduce the risk of identifying multiple matches within guideway database 204 by limiting the comparison to a smaller portion of the guideway.

Automatic speed and braking control system 208 is used to control movement of the vehicle along the guideway. In some embodiments, where VOBC 206 is unable to determine the position of the vehicle, the VOBC sends a signal to the automatic speed and braking control system 208 to brake the vehicle to a stop until a position is determined. In some embodiments, where VOBC 206 is unable to determine the position of the vehicle, the VOBC sends a signal to the automatic speed and braking control system 208 slow the vehicle and stop the vehicle at a next checkpoint.

Sections of guideway have a maximum allowed speed based on mechanical properties of the guideway. For example, in a guideway having rails the maximum allowed speed is determined based on a maximum force exerted to change a distance between the rails, in some instances. VBPS 200 provides an advantage over other position detection systems in that guideway database 204 includes stored inertial parameters of the guideway, e.g., a banked angle of the guideway at a turn. The banked angle impacts a portion of the force exerted to change the distance between the rails to a compressive force acting on the rails. The result is that the speed of the vehicle is able to be increased since the banked angle is known based on the stored inertial parameters of guideway database 204.

In some embodiments, VOBC 206 uses guideway database 204 to determine the stored inertial parameters of portions of the guideway ahead of the vehicle and sends a signal to automatic speed and braking control system 208 to operate the vehicle at a speed greater than a predetermined maximum allowed speed. The increased speed allows for increased efficiency in transportation and reduces travel time of passengers.

In some embodiments, centralized or de-centralized control system 210 receives position information from multiple vehicles along the guideway and provides movement authorization to each of the vehicles based on the received position information. In some embodiments, centralized or de-centralized control system 210 provides the maximum allowed speed information to the vehicle. In some embodiments, VOBC 206 is permitted to override the maximum allowed information speed received from centralized or de-centralized control system 210 based on the stored inertial parameters of guideway database 204.

Figure 3:
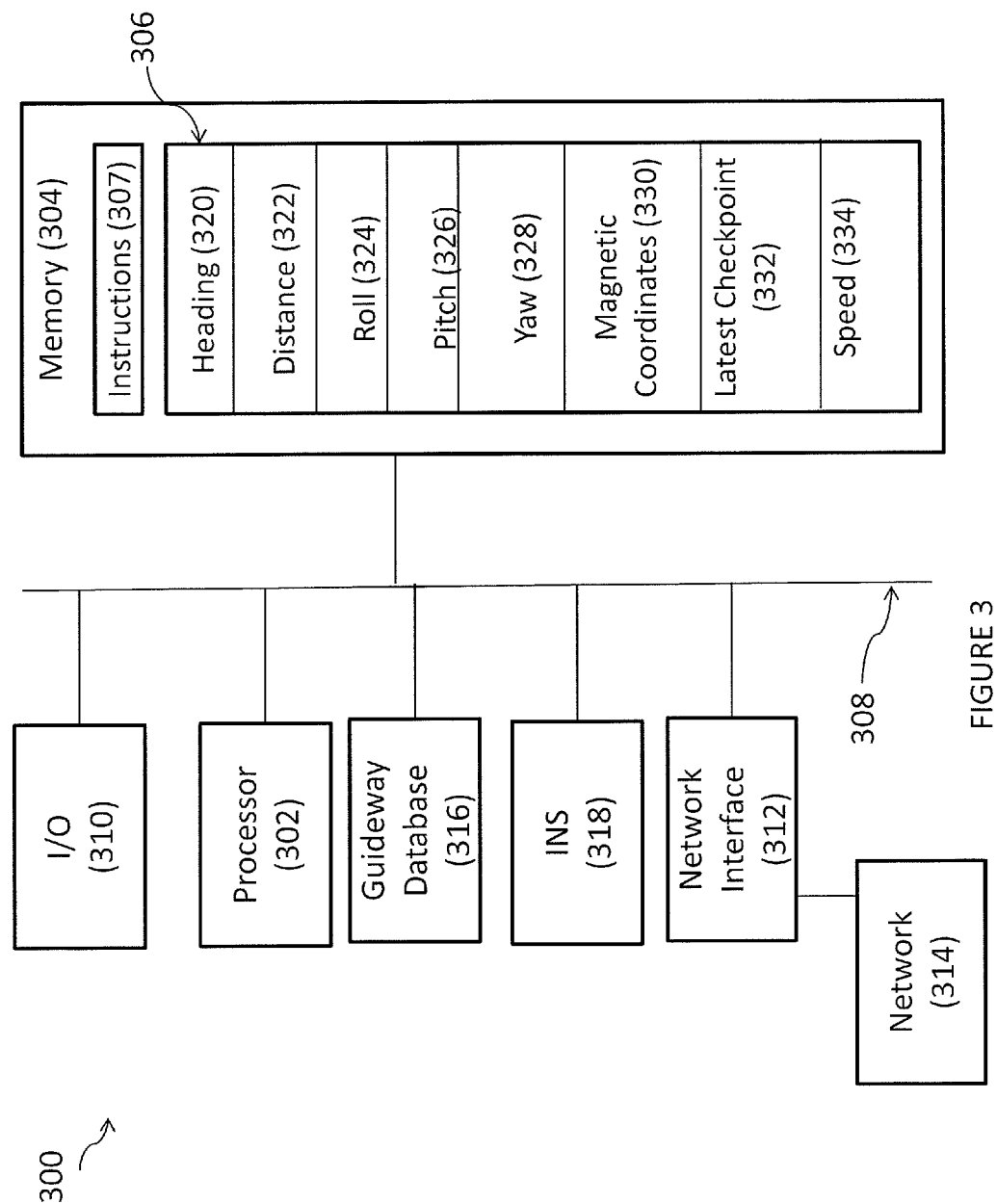
FIG. 3 is a block diagram of a general purpose computing device for implementing a VBPS in accordance with one or more embodiments.

FIG. 3 is a block diagram of a general purpose computing device for implementing a VBPS 300 in accordance with one or more embodiments. In some embodiments, VBPS 300 is similar to VBPS 200 (FIG. 2). VBPS 300 includes a hardware processor 302 and a non-transitory, computer readable storage medium 304 encoded with, i.e., storing, the computer program code 306, i.e., a set of executable instructions. Computer readable storage medium 304 is also encoded with instructions 307 for interfacing with elements of VBPS 300. The processor 302 is electrically coupled to the computer readable storage medium 304 via a bus 308. The processor 302 is also electrically coupled to an I/O interface 310 by bus 308. A network interface 312 is also electrically connected to the processor 302 via bus 308. Network interface 312 is connected to a network 314, so that processor 302 and computer readable storage medium 304 are capable of connecting and communicating to external elements, e.g., automatic speed and braking control system 208 or centralized or de-centralized control system 210 (FIG. 2), via network 314. In some embodiments, network interface 312 is replaced with a different communication path such as optical communication, microwave communication, inductive loop communication, or other suitable communication paths. A guideway database 316 is also electrically connected to the processor 302 via bus 308. Guideway database 316 stores inertial parameters of the guideway. An INS 318 is also electrically connected to the processor 302 via bus 308. INS 318 is configured to detect inertial parameters of the vehicle. The processor 302 is configured to execute the computer program code 306 encoded in the computer readable storage medium 304 in order to cause VBPS 300 to be usable for performing a portion or all of the operations as described with respect to INS 100 (FIG. 1), VBPS 200 (FIG. 2) or a method 500 (FIG. 5).

In some embodiments, the processor 302 is a central processing unit (CPU), a multi-processor, a distributed processing system, an application specific integrated circuit (ASIC), and/or a suitable processing unit. In some embodiments, processor 302 is configured to generate position information signals for transmitting to external circuitry via network interface 312. In some embodiments, processor 302 is configured to generate speed or braking signals for transmitting to external circuitry via network interface 312.

In some embodiments, the computer readable storage medium 304 is an electronic, magnetic, optical, electromagnetic, infrared, and/or a semiconductor system (or apparatus or device). For example, the computer readable storage medium 304 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 304 includes a compact disk-read only memory (CD-ROM), a compact disk-read/write (CD-R/W), and/or a digital video disc (DVD).

Figure 5:
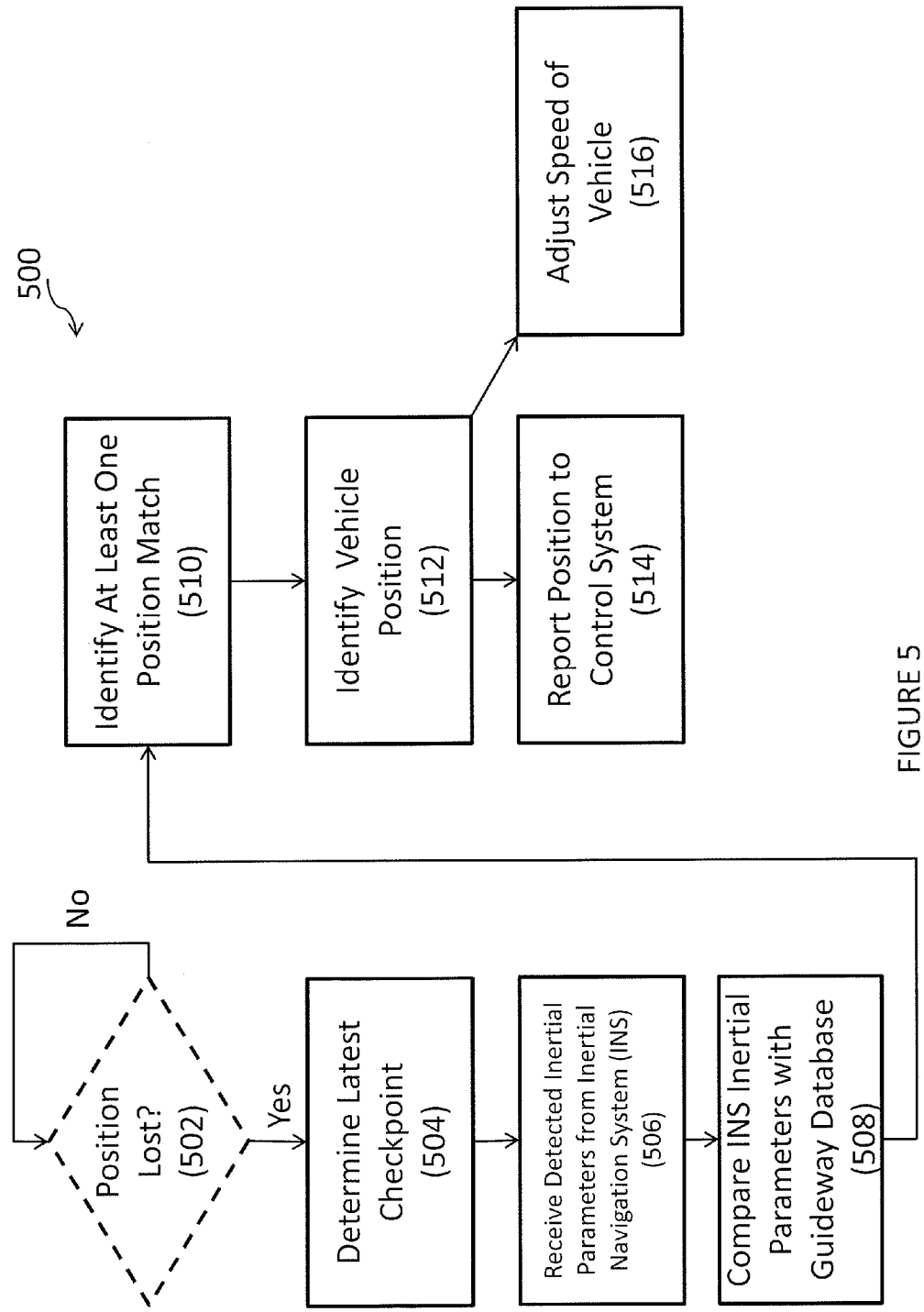
FIG. 5 is a flow chart of a method of operating a VBPS in accordance with one or more embodiments.

In some embodiments, the storage medium 304 stores the computer program code 306 configured to cause VBPS 300 to perform the operations as described with respect to INS 100 (FIG. 1), VBPS 200 (FIG. 2) or method 500 (FIG. 5). In some embodiments, the storage medium 304 also stores information needed for performing the operations as described with respect to INS 100, VBPS 200 or method 500, such as a heading parameter 320, a distance parameter 322, a roll parameter 324, a pitch parameter 326, a yaw parameter 328, a magnetic coordinates 330, a latest checkpoint parameter 332 and a speed parameter 334 and/or a set of executable instructions to perform the operation as described with respect to INS 100, VBPS 200 or method 500.

In some embodiments, the storage medium 304 stores instructions 307 for interfacing with external components. The instructions 307 enable processor 302 to generate operating instructions readable by the external components to effectively implement the operations as described with respect to INS 100, VBPS 200 or method 500.

VBPS 300 includes I/O interface 310. I/O interface 310 is coupled to external circuitry. In some embodiments, I/O interface 310 includes a keyboard, keypad, mouse, trackball, trackpad, and/or cursor direction keys for communicating information and commands to processor 302.

VBPS 300 also includes network interface 312 coupled to the processor 302. Network interface 312 allows VBPS 300 to communicate with network 314, to which one or more other computer systems are connected. Network interface 312 includes wireless network interfaces such as BLUETOOTH, WIFI, WIMAX, GPRS, or WCDMA; or wired network interface such as ETHERNET, USB, or IEEE-1394. In some embodiments, the operations as described with respect to INS 100, VBPS 200 or method 500 are implemented in two or more VBPS 300, and information such as heading, distance, roll, pitch, yaw, magnetic coordinates, latest checkpoint and speed are exchanged between different VBPS 300 via network 314.

VBPS 300 also includes guideway database 316 coupled to the processor 302. Guideway database 316 stores inertial parameters of the guideway cross referenced with the position of the guideway. Guideway database 316 allows VBPS 300 to determine the position of the vehicle based on the stored inertial parameters. In some embodiments, guideway database 316 is the same as guideway database 204 (FIG. 2).

VBPS 300 also includes an INS 318 coupled to the processor 302. INS 318 detects inertial parameters of the vehicle traveling along the guideway. INS 318 allows VBPS 300 to determine the position of the vehicle on the guideway by comparing the detected inertial parameters of INS 318 with the stored inertial parameters of guideway database 316. In some embodiments, INS 318 is the same as INS 100 (FIG. 1). In some embodiments, INS 318 is the same as INS 202 (FIG. 2).

VBPS 300 is configured to receive information related to the heading from INS 318. The information is transferred to processor 302 via bus 308 to determine a direction of travel of the vehicle along the guideway. The heading is then stored in computer readable medium 304 as heading parameter 320. VBPS 300 is configured to receive information related to the distance traveled from a latest checkpoint through I/O interface 310 or network interface 312. The information is transferred to processor 302 via bus 308 to determine a distance traveled from the latest checkpoint. The distance traveled is then stored in computer readable medium 304 as distance parameter 322. VBPS 300 is configured to receive information related to roll of the vehicle from INS 318. The information is stored in computer readable medium 304 as roll parameter 324. VBPS 300 is configured to receive information related to pitch of the vehicle from INS 318. The information is stored in computer readable medium 304 as pitch parameter 326. VBPS 300 is configured to receive information related to yaw of the vehicle from INS 318. The information is stored in computer readable medium 304 as yaw parameter 328. VBPS 300 is configured to receive information related to magnetic coordinates of the vehicle through INS 318. The information is stored in computer readable medium 304 as magnetic coordinates parameter 330. VBPS 300 is configured to receive information related to a latest checkpoint passed by the vehicle through I/O interface 310 or network interface 312. The information is stored in computer readable medium 304 as latest checkpoint parameter 332. VBPS 300 is configured to receive information related to speed of the vehicle through INS 318. The information is stored in computer readable medium 304 as speed parameter 334.

During operation, processor 302 executes a set of instructions to determine a position of the vehicle along the guideway based on a comparison of the parameters stored in computer readable medium 304 and the stored inertial parameters of guideway database 316. In some embodiments, processor 302 uses the latest checkpoint parameter 332 to limit a scope of comparison between the parameters stored in computer readable medium 304 and the stored inertial parameters of guideway database 316.

In some embodiments, processor 302 executes a set of instructions to determine whether to adjust the vehicle speed based on the parameters stored in computer readable medium 304 and the stored inertial parameters of guideway database 316. In some embodiments, processor 302 executes a set of instructions to determine whether the VBPS 300 is experiencing an interruption in communication with a separate position detection system.

Figure 4:
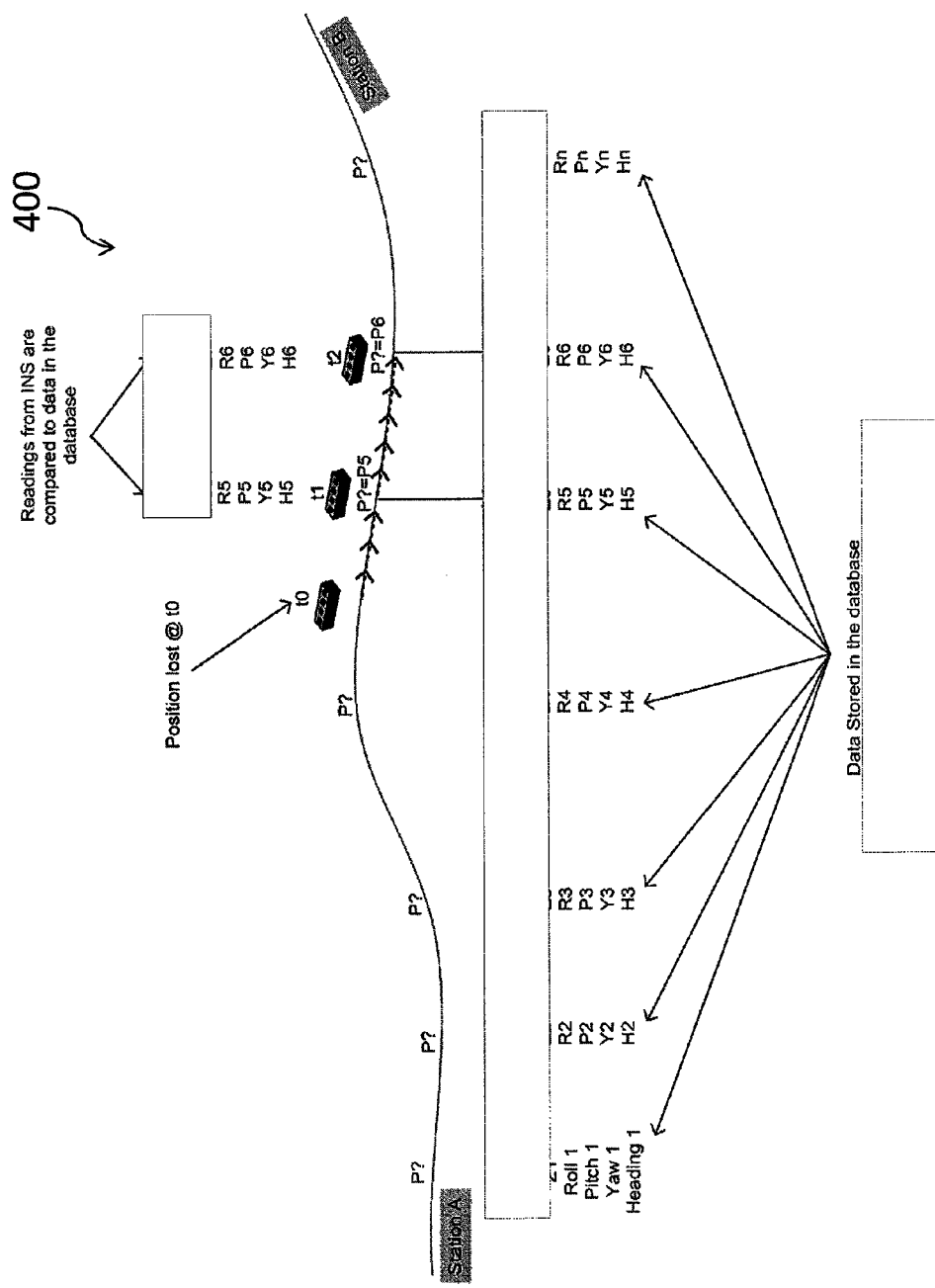
FIG. 4 is a schematic diagram of a vehicle including a VBPS traversing a guideway in accordance with one or more embodiments.

FIG. 4 is a schematic diagram of a vehicle 410 including a VBPS traversing a guideway 420 in accordance with one or more embodiments. Vehicle 410 is equipped with the VBPS, e.g., VBPS 200 (FIG. 2) or VBPS 300 (FIG. 3). In some embodiments, the VBPS is used as a primary position detection system and operates beginning at a start-up of vehicle 410. In some embodiments, the VBPS is a secondary position detection system and is activated following a loss of communication with a separate position detection system. In some embodiments, the VBPS is a secondary position detection system and is activated from the start-up of vehicle 410.

In the example of FIG. 4, the VBPS is used as the secondary position detection system which is activated following a loss of communication with the separate position detection system. At time t0, vehicle 410 losses communication with the separate position detection system. At time t0, a signal is transmitted to an INS of the VBPS, e.g., through transceiver 104 (FIG. 1), to begin detecting inertial parameters, such as roll, pitch, yaw and heading, of vehicle 410. In some embodiments, the VBPS continuously detects the inertial parameters even when operating as the secondary position determining system. Detecting the inertial parameters continuously allows for a more rapid determination of a position of vehicle 410 following loss of communication with the separate position detection system, but increases power consumption by the INS.

At time t1, the INS detects the inertial parameters of vehicle 410. INS transmits the detected inertial parameters, e.g. through transceiver 104, to an on-board controller, e.g., VOBC 206 (FIG. 2). The VBPS compares the detected inertial parameters from the INS with the stored inertial parameters from a guideway database, e.g., guideway database 204 (FIG. 2) or guideway database 316 (FIG. 3). Once a match is determined within a predefined error tolerance, the VBPS positively identifies a position of vehicle 410 as being position P5 along guideway 420. In some embodiments, the VBPS uses the position information to control a speed of vehicle 410, e.g. using automatic speed and braking control system 208 (FIG. 2). In some embodiments, the VBPS transmits the identified position to an external control system, e.g., centralized or de-centralized control system 210 (FIG. 2).

In some embodiments, the VBPS limits the above comparison to the portion of the guideway between a latest checkpoint, Station A, and a next checkpoint, Station B, to decrease computing time and reduce the risk of identifying multiple matches with the stored inertial parameters of the guideway database.

At time t2, the INS detects a second set of inertial parameters. The VBPS compares the detected second set of inertial parameters with the stored inertial parameters of the guideway database and determines vehicle 410 is located at position P6. In some embodiments, the INS detects the inertial parameters continuously. In some embodiments, the INS detects the inertial parameters periodically. In some embodiments, the periodic detection is based on a lapsed time. In some embodiments, the periodic detection is based on an estimated distance traveled.

FIG. 5 is a flow chart of a method 500 of operating a VBPS in accordance with some embodiments. In optional operation 502, an on-board controller, e.g., VOBC 206 (FIG. 2), determines whether communication with a separate position determining system is lost. Operation 502 is included in embodiments where the VBPS functions as a secondary position detection system. Operation 502 is not included in embodiments where the VBPS functions as a primary position detection system. If communication with the separate position determining system is not lost, the operation 502 repeats. If communication with the separate position determining system is lost, method 500 continues with operation 504.

In operation 504, a latest checkpoint is determined. In some embodiments, a checkpoint is a station along the guideway. In some embodiments, the checkpoint is an antenna, a switch or some other suitable landmark. In some embodiments, the latest checkpoint is determined based on information the VBPS receives from an external source, e.g., centralized or de-centralized control system 210 (FIG. 2). In some embodiments, the latest checkpoint is determined based on a comparison between the stored inertial parameters in the guideway database corresponding to a checkpoint and inertial parameters detected by an INS. In some embodiments, VBPS uses the latest checkpoint to limit the scope of comparison of inertial parameters stored in the guideway database. Limiting the scope of comparison reduces computing time and the risk of identifying multiple matches occurring during a comparison.

In operation 506, the VBPS receives the detected inertial parameters from the INS. The detected inertial parameters include heading, roll, pitch and yaw of the vehicle on the guideway. In some embodiments, the detected inertial parameters also includes magnetic coordinates, altitude, distance traveled from the latest checkpoint, speed of the vehicle or other suitable inertial parameters. In some embodiments, the INS detects the heading using an accelerometer. In some embodiments, the INS detects the roll, pitch and yaw using an IMU. In some embodiments, the IMU comprises a plurality of gyroscopes. In some embodiments, the INS detects the heading using the IMU used to detect the roll, pitch and yaw. Once the INS detects the inertial parameters, the INS transmits the detected inertial parameters to the VBPS, e.g., through transceiver 104 (FIG. 1).

In operation 508, the VBPS compares the detected inertial parameters from the INS with the stored inertial parameters from the guideway database, e.g., guideway database 204 (FIG. 2) or guideway database 316 (FIG. 3). In some embodiments, the VBPS limits the scope of comparison of the stored inertial parameters based on the latest checkpoint determined in operation 504. In some embodiments, the VBPS initially compares less than all of the detected inertial parameters with the stored inertial parameters. In some embodiments, the comparison is performed using a processor, e.g., processor 402 (FIG. 4).

In operation 510, the VBPS identifies at least one position match based on the comparison in operation 508. In some embodiments, the VBPS identifies a match if the detected inertial parameters are within the predefined error tolerance of the stored inertial parameters. In some embodiments, the predefined error tolerance is less than 1% difference. In some embodiments, the predefined error tolerance is less than 0.5% difference. In some instances, the VBPS identifies more than one position matching the detected inertial parameters. In some embodiments, the VBPS reduces the risk of identifying more than one position match by limiting the scope of comparison to the stored inertial parameters between the latest checkpoint and a next checkpoint based on the heading of the vehicle.

In operation 512, the VBPS identifies a position of the vehicle based on the at least one identified position match from operation 510. The VBPS identifies the vehicle position as the identified position match if a single position match is identified in operation 510. In some embodiments, the VBPS determines the position based on a smallest amount of difference between the detected inertial parameters and the stored inertial parameters. In some embodiments, the VBPS uses additional detected inertial parameters, such as altitude; magnetic coordinates; or distance traveled from latest checkpoint, to identify the vehicle position if more than one position match is identified in operation 510.

In operation 514, the VBPS reports the vehicle position to a control system, e.g., centralized or de-centralized control system 210. In some embodiments, the VBPS reports the vehicle position using a communication network, e.g., network 314 (FIG. 3). In some embodiments, the VBPS reports the vehicle position using radio communication, inductive loop communication or other suitable communication methods.

In operation 516, the VBPS adjusts a speed of the vehicle based on the identified vehicle position. In some embodiments, if the VBPS is unable to identify a position of the vehicle, the VBPS generates a signal to brake the vehicle to a stop, e.g., using automatic speed and braking control system 208 (FIG. 2). In some embodiments, the VBPS uses the identified vehicle position to determine a configuration of the guideway ahead of vehicle. The VBPS determines a maximum allowable speed based on the configuration of the guideway ahead of the vehicle. In some embodiments, the determined maximum allowable speed of the VBPS overrides a maximum allowable speed provided by an external control system. In some embodiments, the VBPS slows the vehicle until communication with the separate position determining system is re-established. In some embodiments, the VBPS controls a speed of the vehicle to stop at the next checkpoint.

In optional operation 518, the VBPS updates the guideway based on the position identified in operation 512. In some embodiments, operation 518 is performed if a difference between the detected inertial parameters and the stored inertial parameters are below an update threshold value. In some embodiments, the update threshold value is less than 0.5% difference. In some embodiments, the update threshold value is less than 0.25% difference. In some embodiments, the VBPS reports updates to the guideway database to the control system in operation 514 along with reporting the vehicle position to the control system.

One of ordinary skill in the art will recognize the operations of method 500 are merely examples and additional operations are includable, describe operations are removable and an order of operations are adjustable without deviating from the scope of method 500.

A vehicle-based position system according to at least one embodiment is usable with vehicles which have an ability to autonomously control movement through braking and propulsion and the movement of the vehicle is constrained by either tracks, rail, or guideways (all of which are referred to as a guideway above). The system helps to maintain sufficient separation of vehicles at all times. The system also provides accurate stopping of vehicles at specific locations such as stations, parking berths, etc. The stopping accuracy is able to be varied by the system. In some embodiments, the stopping accuracy is on the order of +/−15 cm.

Figures 6A, 6B, 6C, 6D, 6E, 6F:
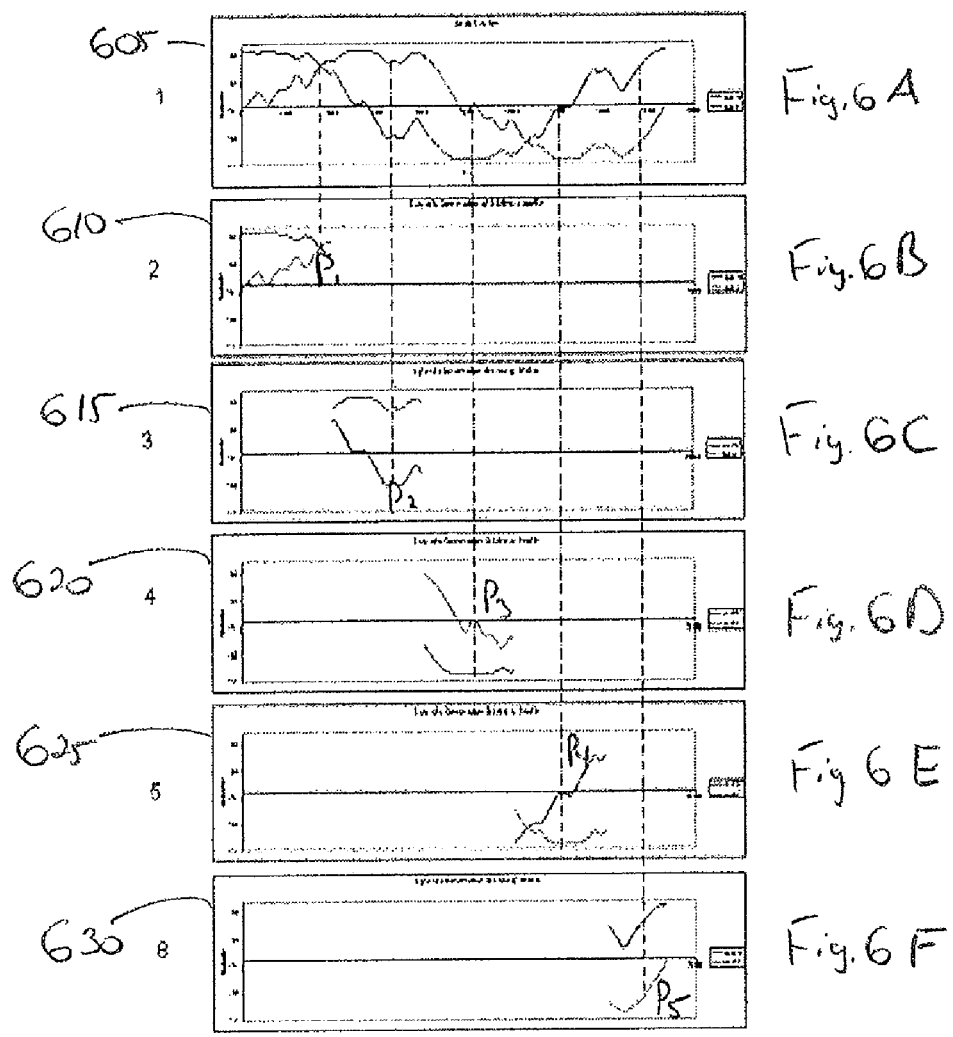
FIGS. 6A-6F are graphs of a VBPS during operation along a section of guideway in accordance with one or more embodiments.

FIG. 6A is a graph of a stored rotation matrix 605 along a section of the guideway. FIG. 6A is a non-limiting examples of the stored inertial parameters of the three-dimensional guideway database, e.g., three-dimensional guideway database 204 (FIG. 2) or three-dimensional guideway database 316 (FIG. 3).

FIG. 6B is a graph of a detected rotation matrix 610 generated based on detected inertial parameters from a latest checkpoint to a first position P1. The VBPS receives the detected rotation matrix 610 from an IMU, e.g., IMU 100 (FIG. 1), and compares the detected rotation matrix 610 with stored rotation matrix 605. Based on the comparison, the VBPS determines the vehicle to be located at first position P1 along the guideway.

FIG. 6C is a graph of a detected rotation matrix 615 generated based on detected inertial parameters from a latest checkpoint, e.g., first position P1, to a second position P2. The VBPS receives the detected rotation matrix 615 from an IMU, e.g., IMU 100, and compares the detected rotation matrix 615 with stored rotation matrix 605. Based on the comparison, the VBPS determines the vehicle to be located at second position P2 along the guideway.

FIG. 6D is a graph of a detected rotation matrix 620 generated based on detected inertial parameters from a latest checkpoint, e.g., second position P2, to a third position P3. The VBPS receives the detected rotation matrix 620 from an IMU, e.g., IMU 100, and compares the detected rotation matrix 620 with stored rotation matrix 605. Based on the comparison, the VBPS determines the vehicle to be located at third position P3 along the guideway.

FIG. 6E is a graph of a detected rotation matrix 625 generated based on detected inertial parameters from a latest checkpoint, e.g., third position P3, to a fourth position P4. The VBPS receives the detected rotation matrix 625 from an IMU, e.g., IMU 100, and compares the detected rotation matrix 625 with stored rotation matrix 605. Based on the comparison, the VBPS determines the vehicle to be located at fourth position P4 along the guideway.

FIG. 6F is a graph of a detected rotation matrix 630 generated based on detected inertial parameters from a latest checkpoint, e.g., fourth position P4, to a fifth position P5. The VBPS receives the detected rotation matrix 630 from an IMU, e.g., IMU 100, and compares the detected rotation matrix 630 with stored rotation matrix 605. Based on the comparison, the VBPS determines the vehicle to be located at fifth position P5 along the guideway.

One aspect of this description relates to a vehicle-based positioning system (VBPS) for a vehicle traversing a guideway. The VBPS includes an inertial navigation system (INS) on-board the vehicle, wherein the INS is configured to detect inertial parameters of the vehicle while the vehicle traverses the guideway, the detected inertial parameters including roll, pitch and yaw of the vehicle. The VBPS further includes a guideway database, wherein the guideway database is configured to store inertial parameters of the guideway at a plurality of locations along the guideway, the stored inertial parameters include roll, pitch and yaw of the guideway. The VBPS further includes a vital on-board controller (VOBC), the VOBC is configured to determine a position of the vehicle based on a comparison of the detected inertial parameters with the stored inertial parameters. The VOBC is configured to limit comparison of the inertial parameters with the stored inertial parameters based on a latest checkpoint passed by the vehicle.

Another aspect of this description relates to a computer readable medium. The computer readable medium includes a processor and a memory containing instructions. The instructions configured to facilitate execution by the processor of detecting inertial parameters of a vehicle traversing a guideway, using an inertial navigation system (INS) on-board the vehicle, wherein the detected inertial parameters include roll, pitch and yaw of the vehicle. The instructions further configured to facilitate execution of comparing, using a vital on-board controller (VOBC), the detected inertial parameters with stored inertial parameters, stored in a guideway database, the stored inertial parameters include roll, pitch and yaw of the guideway. The instructions further configured to facilitate execution of limiting the comparing of the detected inertial parameters with the stored inertial parameters based on a last checkpoint passed by the vehicle and identifying a position of the vehicle based on the comparison.

Still another aspect of this description relates to a method of determining a position of a vehicle traversing a guideway. The method includes detecting inertial parameters of the vehicle traversing the guideway, using an inertial navigation system (INS) on-board the vehicle, wherein the detected inertial parameters include roll, pitch and yaw of the vehicle. The method further includes comparing, using a vital on-board controller (VOBC), the detected inertial parameters with stored inertial parameters, stored in a guideway database, the stored inertial parameters include roll, pitch and yaw of the guideway. The method further includes limiting the comparing of the detected inertial parameters with the stored inertial parameters based on a last checkpoint passed by the vehicle. The method further includes identifying the position of the vehicle based on the comparison.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A vehicle-based positioning system (VBPS) for a vehicle traversing a guideway, the VBPS comprising:
   an inertial navigation system (INS) on-board the vehicle, wherein the INS is configured to detect one or more inertial parameters of the vehicle while the vehicle traverses the guideway, the detected inertial parameters including roll, pitch and yaw of the vehicle;
   a guideway database, wherein the guideway database is configured to store inertial parameters of the guideway corresponding to a plurality of locations along the guideway, the stored inertial parameters including roll, pitch and yaw of the guideway; and
   a vital on-board controller (VOBC), the VOBC is configured to determine a position of the vehicle based on a comparison of the detected inertial parameters with the stored inertial parameters,
   wherein the VOBC is configured to limit comparison of the inertial parameters with the stored inertial parameters based on a latest checkpoint passed by the vehicle.

2. The VBPS of claim 1, wherein the INS comprises at least one accelerometer and a plurality of gyroscopes.

3. The VBPS of claim 1, further comprising an automatic speed and braking control system, wherein the automatic speed and braking control system configured to adjust a speed of the vehicle in response to a speed signal generated by the VOBC as a function of distance traveled, time, and acceleration.

4. The VBPS of claim 3, wherein the VOBC is configured to determine a maximum allowed speed either from an external control system or from an internal database, and the VOBC is configured to control the speed of the vehicle not to exceed the maximum allowed speed based on the stored inertial parameters.

5. The VBPS of claim 1, wherein the INS is further configured to determine at least one of a bearing of the vehicle, a heading of the vehicle or an altitude of the vehicle.

6. The VBPS of claim 1, wherein the VBPS is configured to transmit the determined position of the vehicle to an external control system.

7. The VBPS of claim 1, wherein the VOBC is configured to update the guideway database based on the determined position.

8. A tangible, non-transitory computer readable medium, the computer readable medium comprising:
a processor; and
a memory containing instructions, the instructions configured to facilitate execution by the processor of the following steps:
detecting inertial parameters of a vehicle traversing a guideway, using an inertial navigation system (INS) on-board the vehicle, wherein the detected inertial parameters include roll, pitch and yaw of the vehicle;
comparing, using a vital on-board controller (VOBC), the detected inertial parameters with stored inertial parameters, stored in a guideway database, the stored inertial parameters include roll, pitch and yaw of the guideway;
limiting the comparing of the detected inertial parameters with the stored inertial parameters based on a last checkpoint passed by the vehicle; and
identifying a position of the vehicle based on the comparison.

9. The tangible, non-transitory computer readable medium of claim 8, wherein detecting the inertial parameters of vehicle comprises using at least one accelerometer and a plurality of gyroscopes.

10. The tangible, non-transitory computer readable medium of claim 8, wherein the instructions are further configured to facilitate execution of controlling a speed of the vehicle, using an automatic speed and braking control system, in response to a speed signal generated by the VOBC.

11. The tangible, non-transitory computer readable medium of claim 10, wherein the instructions are further configured to facilitate execution of:
receiving a maximum allowed speed from an external control system or internal database; and
generating the speed signal not to exceed the maximum allowed speed based on the stored inertial parameters.

12. The tangible, non-transitory computer readable medium of claim 8, wherein detecting the inertial parameters of vehicle comprises detecting at least one of a bearing of the vehicle, a heading of the vehicle or an altitude of the vehicle.

13. The tangible, non-transitory computer readable medium of claim 8, wherein the instructions are further configured to facilitate execution of transmitting the determined position of the vehicle to an external control system.

14. The tangible, non-transitory computer readable medium of claim 8, wherein the instructions are further configured to facilitate execution of updating the guideway database based on the determined position.

15. A method of determining a position of a vehicle traversing a guideway, the method comprising:
detecting inertial parameters of the vehicle traversing the guideway, using an inertial navigation system (INS) on-board the vehicle, wherein the detected inertial parameters include roll, pitch and yaw of the vehicle;
comparing, using a vital on-board controller (VOBC), the detected inertial parameters with stored inertial parameters, stored in a guideway database, the stored inertial parameters include roll, pitch and yaw of the guideway;
limiting the comparing of the detected inertial parameters with the stored inertial parameters based on a last checkpoint passed by the vehicle; and
identifying the position of the vehicle based on the comparison.

16. The method of claim 15, wherein detecting the inertial parameters of vehicle comprises using at least one accelerometer and a plurality of gyroscopes.

17. The method of claim 15, controlling a speed of the vehicle, using an automatic speed and braking control system, in response to a speed signal generated by the VOBC.

18. The method of claim 17, further comprising:
receiving a maximum allowed speed from an external control system; and
generating the speed signal not to exceed the maximum allowed speed based on the stored inertial parameters.

19. The method of claim 15, further comprising transmitting the determined position of the vehicle to an external control system.

20. The method of claim 15, further comprising updating the guideway database based on the determined position.

* * * * *